(12) United States Patent
Lubrano

(10) Patent No.: US 9,218,226 B2
(45) Date of Patent: Dec. 22, 2015

(54) SYSTEM AND METHODS FOR REMOTE ACCESS TO IMS DATABASES

(71) Applicant: BMC Software, Inc., Houston, TX (US)

(72) Inventor: Anthony Louis Lubrano, Sugar Land, TX (US)

(73) Assignee: BMC Software, Inc., Houston, TX (US)

( * ) Notice: Subject to any disclaimer, the term of this patent is extended or adjusted under 35 U.S.C. 154(b) by 221 days.

(21) Appl. No.: 13/793,568

(22) Filed: Mar. 11, 2013

(65) Prior Publication Data

US 2014/0258507 A1  Sep. 11, 2014

(51) Int. Cl.
*G06F 17/30* (2006.01)
*G06F 9/54* (2006.01)

(52) U.S. Cl.
CPC ............ *G06F 9/541* (2013.01); *G06F 17/3056* (2013.01)

(58) Field of Classification Search
CPC .................... G06F 17/30563; G06F 17/30286; G06F 17/30575
USPC ......................................... 707/705; 709/224
See application file for complete search history.

(56) References Cited

U.S. PATENT DOCUMENTS

| | | | |
|---|---|---|---|
| 8,312,465 B2 * | 11/2012 | Pierce et al. ................... | 718/105 |
| 2003/0204510 A1 * | 10/2003 | Ball et al. ........................ | 707/100 |
| 2007/0089107 A1 * | 4/2007 | Squires ................. | G06F 9/4426 717/162 |
| 2014/0258256 A1 | 9/2014 | Dee et al. | |

OTHER PUBLICATIONS

Gopal Krishnan; "Leveraging zIIP, zAAP Specialty Engines with DB2 for z/OS" by IBM Silicon Valley Lab, dated Dec. 2008, 54 pages.*
System Programming APIs, IMS Version 11, IBM, May 2012, pp. 305-350, 46 pages.
Non-Final Office Action received for U.S. Appl. No. 13/793,365, mailed on Jan. 6, 2015, 13 pages.

* cited by examiner

*Primary Examiner* — Monica Pyo
(74) *Attorney, Agent, or Firm* — Brake Hughes Bellermann LLP

(57) ABSTRACT

Systems and methods are provided that allow client programs using IMS database access interfaces to access IMS database data available from IMS systems on remote logical partitions and remote zSeries mainframes rather than from a local IMS system. For example, a method may include intercepting an IMS request having a documented IMS request format from a client program executing on a source mainframe system. The method may also include selecting a destination mainframe system and sending a buffer including information from the request from the source mainframe system to the destination mainframe system and establishing, at the destination mainframe system, an IMS DRA connection with the IMS system from the request. The method may further include receiving a response from the IMS system, sending a buffer having information from the response from the destination mainframe system to the source mainframe system, and providing the information to the client program.

19 Claims, 4 Drawing Sheets

SYSTEM AND METHODS FOR REMOTE ACCESS TO IMS DATABASES

TECHNICAL FIELD

This disclosure relates generally to the field of remote access to mainframe-based data. More particularly, but not by way of limitation, this disclosure refers to a system for accessing IMS® data from a remote mainframe.

BACKGROUND

International Business Machine Corporation (IBM) mainframes provide online transaction processing subsystems, such as Information Management System (IMS®) and Customer Information Control System (CICS®) (IMS and CICS are registered trademarks of IBM), that enable high-speed transaction processing of data stored in file structures. Each processing subsystem has file structures unique to their environment. For example, IMS transactions access data stored in IMS databases and CICS transactions access data stored in VSAM data sets. For various reasons, the majority of data is stored in IMS databases. Generally, applications and transactions running outside of the subsystems could not access the data stored within the subsystem.

To allow outside access to subsystems, IBM first introduced an interface allowing CICS transactions to have high-speed access to IMS databases. The interface allows CICS to access IMS databases while the databases are available for online IMS transaction processing. This interface is known as the IMS Database Resource Adapter or DRA. DRA requires CICS systems to connect to a separate IMS system running on the same system or logical partition (LPAR) as the CICS system. Each LPAR is, in practice, equivalent to a separate mainframe. Thus, for an instance of CICS to have access to an IMS database, IMS must be running on the same system as the instance of CICS. This results in multiple installations of IMS systems at a customer site, for example on multiple LPARs within a sysplex. The costs that result from the multiple installations can be prohibitive, leaving some customers without the ability to integrate CICS transactions with IMS databases. While IBM has introduced other interfaces that allow programs to have access to remote IMS databases, such interfaces require a change to the business application source code. Many legacy business application programs still use the DL/I interface.

SUMMARY

Systems and methods are provided that allow business application programs using documented IMS database access interfaces (e.g., Data Language Interface (DL/I), Open Database Access (ODBA), Database Resource Adaptor (DRA), etc.) and running on IBM zSeries platforms to access IMS database data not locally available. The IMS database data may be accessible from IMS systems on remote logical partitions and remote zSeries mainframes anywhere in the world; using any telecommunication technology that has been implemented to allow communication between the different locations. Remote communication can be implemented, for example, via TCP/IP, VTAM/SNA, Cross-System Coupling Facility (XCF) messaging or any other, as yet undefined, telecommunication technology. Implementations provide such remote access without changes to the business application programs or the IMS systems.

In one general aspect, a mainframe computing system includes at least one general processor, a client program executing on the mainframe computing system, the client program configured to make an IMS request using a documented IMS database request format, and a redirect subsystem. The redirect subsystem may be configured to intercept and normalize the IMS request and to select a destination mainframe computing system to respond to the request. The selection may be based on a map that associates remote IMS systems with corresponding mainframe computing systems. The redirect subsystem may also be configured to schedule a communication request directed to the destination mainframe computing system. The request may include the normalized IMS request. The redirect subsystem may further be configured to receive a normalized response from the destination mainframe computing system, to convert the normalized response into a documented IMS database response format, and to provide the converted response to the client program.

Implementations of the mainframe computing system may include one or more of the following features. For example, the mainframe computing system may also include at least one zIIP processor and the redirect subsystem may be further configured to perform at least one of its operations using a zIIP eligible service request block. In some implementations, the redirect subsystem may be configured to normalize the IMS request using a zIIP eligible service request block and to resume the zIIP eligible service request block to convert the normalized response into the documented IMS database format. In some implementations the mainframe computing system and the destination mainframe computing system may be different logical partitions of a sysplex. In some implementations the IMS request may specify a first IMS system and the response from the destination mainframe computing system may be from a second IMS system that differs from the first IMS system. In some implementations, the client program is a CICS subsystem and a first CICS transaction may specify a different IMS system than a second CICS transaction. In some implementations, the client program is a batch application and intercepting the IMS request includes intercepting an attach request made by the operating system of the mainframe computing system to instantiate the batch application. In some implementations, the normalized IMS request uses a Database Resource Adaptor connection format.

In another aspect, a computer-implemented method includes intercepting an IMS request from a client program executing on a source mainframe system, the request having a documented IMS request format, and selecting a destination mainframe system to respond to the request. The selection of the destination mainframe may be based on an IMS system identified in the request and on a map that associates remote IMS systems with corresponding mainframe systems. The method may also include sending a buffer including information from the request from the source mainframe system to the destination mainframe system and establishing, at the destination mainframe system, an IMS Database Resource Adapter (DRA) connection with the IMS system identified in the request. The method may also include receiving a response from the IMS system, sending a buffer having information from the response from the destination mainframe system to the source mainframe system, and providing the information to the client program in a documented IMS response format.

Implementations may include one or more additional features. For example, the method may also include determining, at the destination mainframe system, that the IMS system identified in the request cannot process the request and establishing, at the destination mainframe system, an IMS DRA connection with another IMS system that is in a data sharing group with the IMS system identified in the request. In some implementations, the client program may be CICS and intercepting the IMS request includes modifying CICS libraries to redirect the IMS request from a DRA associated process to a redirect server on the source mainframe system. As another example, the source mainframe may lack IMS executable code.

In another aspect, a destination mainframe system includes at least one general processor, an IMS subsystem including IMS executable code, and a redirect subsystem. The redirect subsystem may be configured to notify a source mainframe system of the existence of the IMS subsystem on the destination mainframe, where the source mainframe lacks IMS executable code. The redirect subsystem may also be configured to receive a first buffer from the source mainframe system, the first buffer including information from an IMS request that identifies the IMS subsystem in a normalized format and convert the information to an IMS Database Resource Adapter (DRA) format. The redirect subsystem may further be configured to queue the information from the first buffer to an IMS connection task for the IMS subsystem, receive a response from the IMS subsystem in the DRA format, and generate a second buffer having information from the response in the normalized format. The redirect subsystem may also be configured to send the second buffer to the source mainframe system.

In some implementations, the destination mainframe system may also include at least one lower cost processor and the redirect subsystem may be configured to perform at least some of the operations using a service request block eligible to run on the lower cost processor. In other implementations, the destination mainframe system may include a data sharing group, and the IMS subsystem may be one of a plurality of IMS subsystems in the data sharing group. In such an implementation, the redirect subsystem may be further configured to determine that the IMS subsystem is unavailable and queue the second buffer to an IMS connection task with another IMS subsystem from the plurality of IMS subsystems. Thus, the response may be received from the another IMS subsystem. In some implementations, the normalized format is a DRA connection format and converting the information includes adjusting pointers in the first buffer.

In one general aspect, a computer program product being tangibly embodied on a computer-readable storage device stores instructions that, when executed by at least one processor causes a computer system to perform any of the disclosed methods.

One or more of the implementations of the subject matter described herein can be implemented so as to realize one or more of the following advantages. As one example, a redirection system eliminates the technical requirement of having an IMS system or IMS executable code present on the same system, for example a Logical Partition (LPAR), as the client application programs, such as CICS or batch programs. Moreover, the redirection system allows client application programs to connect with remote IMS systems without system or application program changes. This allows legacy programs that are difficult or impossible to modify to connect to remote IMS systems. Because the redirection system does not require IMS to be installed on the same system as CICS, a customer can reduce the number of LPARs with IMS executable code within a sysplex. The reduction in the number of LPARs with IMS executable code simplifies IMS software maintenance strategies and reduces license charges for the customer. This has the effect of lowering customer costs in terms of both people and software. While the implementation of the redirection system may result in longer data access paths, which may increase transaction processing times, the increase is inconsequential because mainframes can now execute billions of instructions per second and data transmission speeds have increased from 300 bps (bits per second) to 45 Mbps (Megabits per second) and more.

As another example, the redirection system also provides redundancy not currently available to client programs, such as CICS subsystems. For example, if a client program requests data from an IMS system in a data sharing group that is not responding, the redirection system may select another IMS system from the data sharing group to process the request. The details of one or more implementations are set forth in the accompanying drawings and the description below. Other features will be apparent from the description and drawings, and from the claims.

DETAILED DESCRIPTION

Disclosed implementations replace the current IMS access interface with a redirection subsystem that initiates remote IMS services and provides a communication link for IMS database requests. The redirection subsystem can be used with other mainframe subsystems, such as CICS, with batch business application programs, such as BMP, DLI, DBB, etc., or with other processes that use a documented IMS database access interface, such as the Data Language Interface (DL/I), Open Database Access (ODBA) interface, DRA interface, etc. The processes that use the IMS access interface are considered client programs. The redirection subsystem uses the documented IMS database access interface to provide a transparent request/response mechanism for the client programs. In other words, the requesting client program does not know the IMS subsystem it receives data from is remote, and the IMS subsystem responding to the request does not know that the request came from a different LPAR or a different mainframe. As discussed above, this allows fewer installations of IMS and redundancy without changes to the client programs themselves. This can be especially important for allowing legacy application programs, for which source code can be unavailable or undesirable to modify, to take advantage of lower operating costs and fewer outages.

Figure 1:
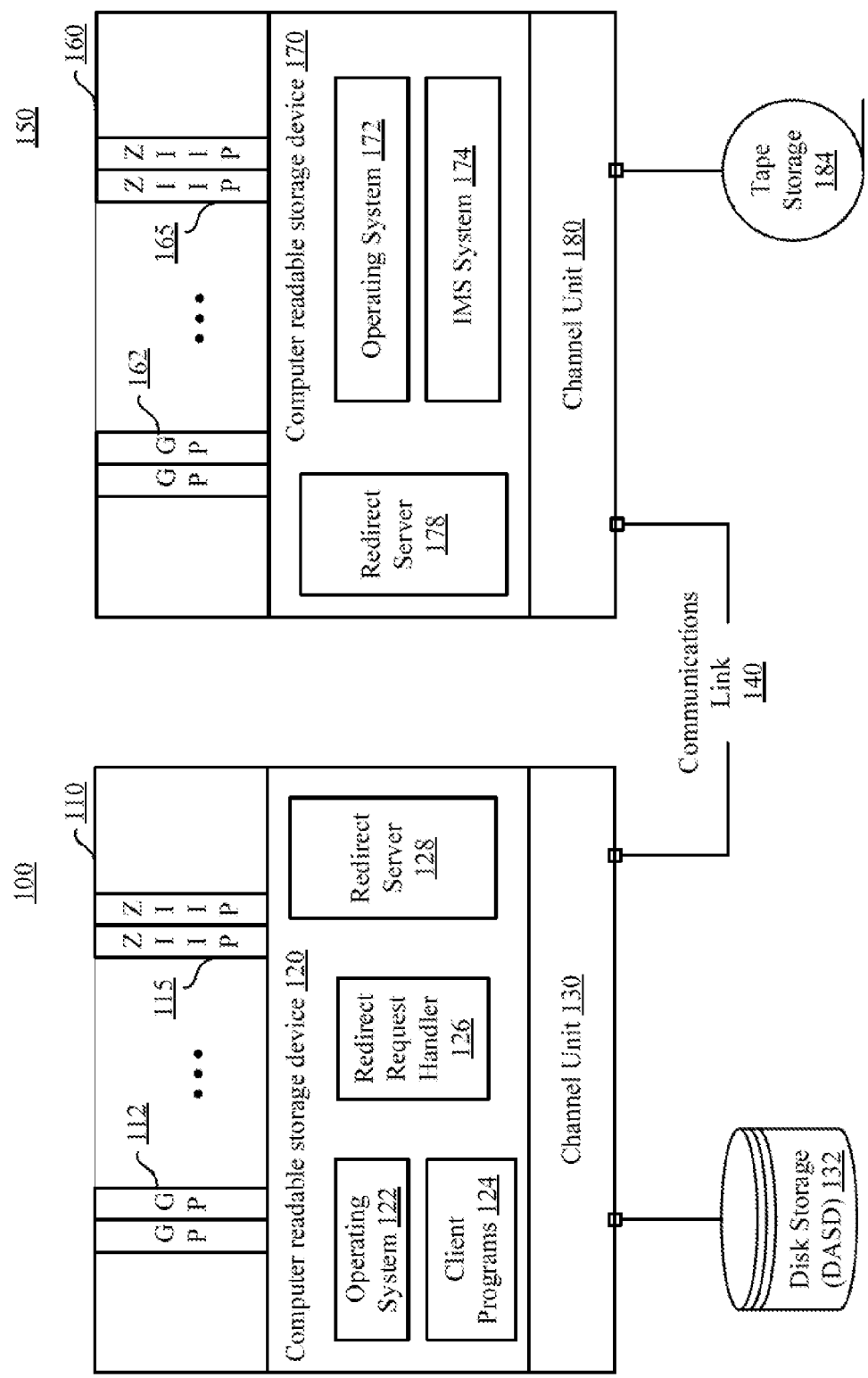
FIG. 1 is a block diagram that illustrates an exemplary IBM mainframe with remote IMS access, in accordance with some implementations.

FIG. 1 illustrates a high level block diagram of an exemplary IBM mainframe with remote IMS access. FIG. 1 illustrates two mainframe computing systems 100 and 150. Mainframe computers are large, multi-processor computing devices able to perform thousands of tasks every second. Because of their large size and processing power, usage of processing time is often tracked and customers are billed based on their processor usage. In some implementations system 100 and system 150 are two LPARs in a sysplex. An LPAR is a logical segmentation of a mainframe's memory and other resources that allows it to run its own copy of an operating system and associated applications, making the LPAR, in practice, equivalent to a separate mainframe. Accordingly, processing may be billed separately for each LPAR, depending on its configuration. LPARs may be enabled via special hardware circuits or purely through software. A system administrator can assign one or more system processors for the exclusive use of an LPAR. Alternately, the administrator can allow all processors to be used on some or all LPARs. LPAR's may also allow multiple system images (of the same operating system or different operating systems) to run in one machine. Furthermore, each LPAR can execute one or more subsystems within an operating system. A sysplex is a collection of LPARs that cooperate to process work. LPARs in a sysplex can communicate with each other without a CICS control region using Cross-system Coupling Facility ("XCF") communications. In some implementations system 100 and system 150 may be mainframes that are physically and logically distinct from and/or geographically separated from one another. Although shown in FIG. 1 as IBM zSeries® mainframes, implementations are not so limited (zSeries is a registered trademark of the IBM Corporation.). Thus, although referred to as mainframe computing system 100 and mainframe computing system 150, it is to be understood that mainframe computing system 100 and mainframe computing system 150 may be logical partitions of a single physical mainframe computer.

The mainframe computing systems 100 and 150 can include one or more processors configured to execute one or more machine executable instructions or pieces of software, firmware, or a combination thereof. In some implementations, the processor frame, such as frame 110 and 160, may include a plurality of General Processors (GPs) (112 and 162) and a plurality of zSeries Integrated Information Processors (zIIPs) (115 and 165). The operating system, such as operating system 122 or 172, may run all workloads on the GPs but may only run certain workloads on the zIIPs. The general processor has a run-time cost associated with the amount of workload it performs. Workload and capacity of mainframe systems is generally measured in MIPS (Millions of Instructions Per Second). Based on the amount of capacity purchased or licensed by a customer, the capacity of the GP may be "throttled down" such that it is not running at the top of its technically available processing capability. A zSeries mainframe may also include one or more zSeries Integrated Information Processors (zIIPs). The zIIPs are intended to offload work from the general processors of the mainframe computer system. Workloads running on a zIIP processor generally run either for free or at a fraction of the price of the GP. These processors generally do not contain microcode or hardware features that accelerate their designated workload. In other words, a zIIP is typically configured to run at its full speed because the pricing structure does not directly depend on the throughput of this type of processor. Thus, a zIIP is financially different from a GP because unlike workloads performed by the GP, the zIIP permits increasing system capacity for targeted workloads without raising software license fees. Thus, a zIIP may be considered a lower-cost processor. However, only workloads defined by IBM as zIIP-eligible can execute on a zIIP. Generally, workloads scheduled using a zIIP eligible service request block (SRB) are considered zIIP eligible.

The mainframe computing systems 100 and 150 may also include one or more computer readable storage devices, such as devices 120 and 170. The computer readable storage devices may include main memory, cache, or disk storage, configured to store data and/or applications, either temporarily, permanently, semi-permanently, or a combination thereof. The storage devices may include volatile memory, non-volatile memory, or a combination thereof. The mainframe computing systems 100 and 150 can include an operating system, such as operating system 122 and operating system 172. The operating system can be the z/OS operating system or some other mainframe operating system. The mainframe computing system 100 may include one or more client programs 124. Client programs 124 may include any code written to execute on the mainframe computing system 100. For example, client programs 124 may include mainframe subsystems, such as CICS and Resource Access Control Facility (RACF), vendor-supplied business application programs, and proprietary programs.

The mainframe computing system 100 may also include a redirect request handler 126 and a redirect server 128, which together comprise a redirection subsystem. The redirect request handler 126 may intercept an IMS request made by a client program, such as CICS or a business batch application. The client program may set up the IMS request as if using a documented IMS database access interface, such as the DRA or ODBA interface, and may have no indication that the request will be handled by the redirect request handler 126 rather than the programmed access interface. The redirect request handler 126 may receive the request and schedule a zIIP eligible service request block (SRB) that allows the redirect server 128 to normalize the data from the request, determine where to send the request, and to initiate transport of the request to the determined server, as will be explained in more detail below. Redirect server 128 may be configured as a client-side server that forwards requests to a server-side redirect server and processes a response received from the server-side redirect server.

The mainframe computing system 150 may include a redirect server 178. The redirect server 178 may be configured as a server-side redirect server that receives an IMS request from a client-side redirect server, selects an IMS system to process the request, to set up the environment for IMS to receive, process, and respond to the request, and to send the response from the IMS system back to the client-side redirect server. In some implementations, redirect server 128 and redirect server 178 may be configured to serve as both a client-side and a server-side redirect server. In other words, redirect server 128 may also be configured to act as redirect server 178, and redirect server 178 may be configured to act as redirect server 128. Mainframe computing system 150 may also include one or more IMS systems 174. In some implementations, the IMS system 174 may be part of an IMS data sharing group that has access to the same set of IMS databases.

In some implementations, the mainframe computing system 100 and mainframe computing system 150 may also include a channel unit, such as channel unit 130 and channel unit 180, for processing Input/Output (I/O) requests. The channel unit may include a communications link 140, which may be a telecommunications link, a network interface, a communication bus, or some other communication link. For example, mainframe computing system 100 and mainframe computing system 150 may communicate with each other using XCF, TCP/IP, SNA, or other communication protocols over communications link 140. The channel unit may also include a tape storage unit 184 and/or a disk storage device 132 sometimes referred to as a Direct Access Storage Device (DASD). In some implementations, mainframe computing system 100 may include one or more other hardware components not shown in FIG. 1, such as for example, a display or monitor, a keyboard, a touchscreen, a camera, a mouse, a touchpad, a trackpad, a video processor, etc., through which a user may send data to and receive data from mainframe computing system 100 or mainframe computing system 150. In some implementations, the user may use a second computing device (not shown) in communication with mainframe computing system 100 via a communications network to send data to and receive data from mainframe computing system 100. The user may also communicate with mainframe computing system 150 in a similar manner.

Figure 2:
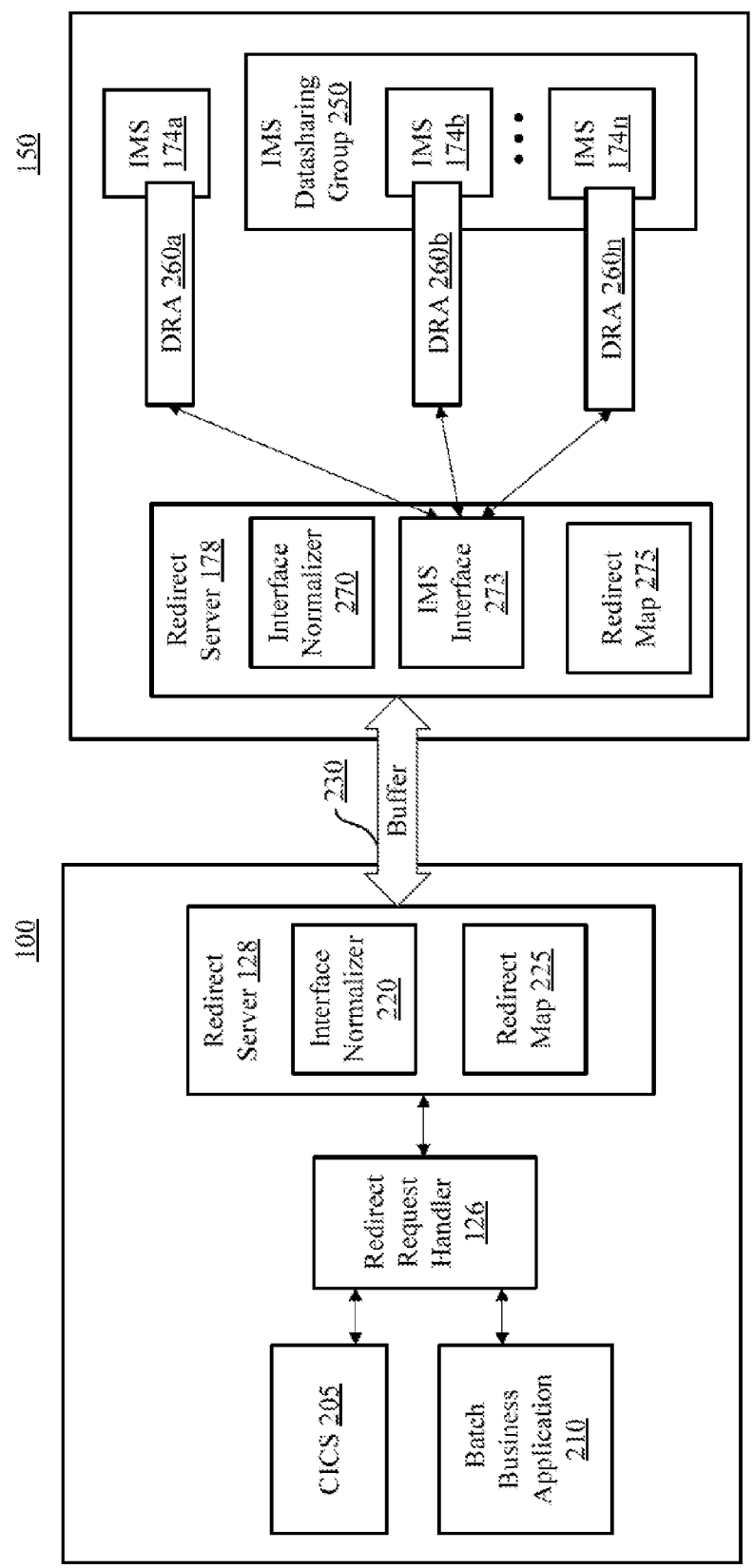
FIG. 2 is a block diagram illustrating example modules within the IMS redirect subsystems of the mainframes of FIG. 1, in accordance with some implementations.

FIG. 2 is a block diagram that illustrates example modules within the IMS redirection subsystems of the mainframes of FIG. 1, in accordance with some implementations. In the example of FIG. 2, the client programs 124 of FIG. 1 include CICS 205 and batch business application 210. Each client program may initiate one or more IMS database requests, which are handled by the redirect request handler 126 instead of a documented IMS database access interface. For example, a mainframe administrator may concatenate a library for redirect request handler 126 to the IMS library in the CICS region of mainframe computing system 100. The concatenation may cause system 100 to configure CICS 205 to use the redirect request handler 126 instead of the documented IMS database access interface, such as a DRA interface, to handle IMS database requests.

When the batch business application 210 executes, it may use an attach interface to attempt to attach to IMS. For example, to execute operations on mainframe computing system 100, the operating system may issue an ATTACH or an ATTACHX request to instantiate a computer program, such as batch business application 210. ATTACH is a documented z/OS service that creates the control blocks needed to schedule the operation for execution on a processor and, therefore, may be considered a control block creation process. ATTACHX provides the same function as ATTACH but can execute in more varied operating system states. Thus, for the purposes of implementations any reference to the ATTACH service also refers to the ATTACHX service. The redirect request handler 126 may intercept the attach request and cause the batch business application 210 to attach to the redirect request handler 126 rather than the DRA interface, for example. In either situation, the redirection of the IMS request to the redirect request handler 126 may be transparent to the client program.

In setting up the environment to connect to IMS, IBM has utilized some specific parameters. For example, each request can include a Participant Adapter Parameter List or PAPL. The PAPL is a type of control block that contains information for accessing IMS database data and is documented by IBM. A control block, or just block, is a memory structure that stores data about a specific entity and may have addresses, or pointers, to still other blocks. For example, the PAPL for a CICS client program includes information that ties the IMS database access request to a transaction in the CICS environment. Because CICS is a multi-transaction environment, CICS can initiate multiple requests in parallel. The PAPL enables CICS to determine which request a particular response belongs to. The IMS request may also contain a Segment Search Argument, or SSA. The SSA is a data block that identifies an IMS database segment to access. The IMS request may also include an input-output area for receiving the data from IMS. Although each of these elements is generally present in an IMS request from any client program, each client may arrange the elements in a different format.

Once the redirect request handler 126 receives an IMS request, it may schedule a zIIP eligible SRB that invokes the redirect server 128. Running the tasks of the redirect server 128 on a zIIP processor saves cost, as explained above. Creating the SRB as zIIP eligible does not guarantee that the tasks run on a zIIP processor rather than a GP processor, but makes it possible to do so. The redirect server 128 may include an interface normalizer 220 that takes the IMS request from the client program and normalizes the data in the request so that all data communicated between client-side and server-side redirect servers have the same format, regardless of the format used by the client program. As mentioned above, the normalization process may be scheduled using a zIIP eligible SRB to keep processing costs down. The redirect server 128 may also include a redirect map 225. The redirect map 225 may enable redirect server 128 to determine the destination system for the request. The destination system is the mainframe computing environment that is running the IMS segment requested by the client program. Each redirect server may notify the other redirect servers about the IMS environments that it services. For example, redirect server 178 may inform redirect server 128 that it has access to a number of IMS environments including IMS 174a and a data sharing group 250 that includes n IMS systems, namely IMS 174b to IMS 174n. When redirect server 128 receives this information it may create or update redirect map 225, so that it knows that client programs requesting access to, for example, IMS system 174a should be directed to mainframe computing system 150. If redirect server 128 has access to any IMS systems, it may also report these systems to, for example, redirect server 178 and redirect server 178 would store this information in redirect map 275.

When redirect server 128 determines where to send the normalized request, it may send the request to the destination system using any number of communication protocols. For example, if mainframe computing system 100 and mainframe computing system 150 are LPARs within the same sysplex, the redirect server 128 may send the request using XCF, which is a high-speed communications protocol for LPARs within a sysplex. If mainframe computing system 100 and mainframe computing system 150 are geographically remote, redirect server 128 may send the request using TCP/IP or Systems Network Architecture (SNA) protocols.

When redirect server 178 receives a request, it may de-normalize the request and place the request on an IMS queue. For example, redirect server 178 may include interface normalizer 270, which may take the buffer 230 received from redirect server 128 and place the normalized data into a format expected by a DRA connection interface. In some implementations the normalized data may be in a DRA connection format, and interface normalizer 270 may only need to adjust some pointers as part of the de-normalization. The redirect server 178 may also include an IMS interface 273 that creates the Coordinator Controller, or CCTL, needed to access an IMS system. The CCTL is an address space responsible for establishing an IMS DRA connection. Each IMS subsystem may have its own version of the DRA, as illustrated in FIG. 2 by items 260a and 260b to 260n. Although shown in FIG. 2 as a DRA connection, this is one example of an IMS connection and implementations may include other existing or newly created connection interfaces. The IMS interface 273 may determine which of the IMS subsystems to invoke and may create the CCTL using the de-normalized request and place the request on the appropriate IMS queue using an IMS connection task. In other words, the redirect server 178 may use the DRA interface to establish the IMS connection. This ensures that no changes are needed in the IMS system to make the IMS system available remotely. Once on the IMS queue, the IMS system may process the request and send back a response through the appropriate DRA interface. The response may include the data requested and, optionally, other information such as statistics or status information. The DRA may pass the response back to the IMS interface 273. The IMS interface 273 may schedule a zIIP eligible SRB to construct the response buffer, which includes normalizing the response, and may send the response buffer back to the requesting system. The response buffer may be communicated back to the requesting system using the communication protocol used to receive the request.

When the redirect server 128 of mainframe computing system 100 receives the response, the redirect server 128 may resume the zIIP eligible SRB that was used to send the request. Upon resumption, the redirect server 128 may de-normalize the data and reconstruct the response areas, placing the response into a format expected by the client program. The redirect server 128 may pass the de-normalized response area back to the redirect request handler 126, which provides the response to the client program.

Figure 3:
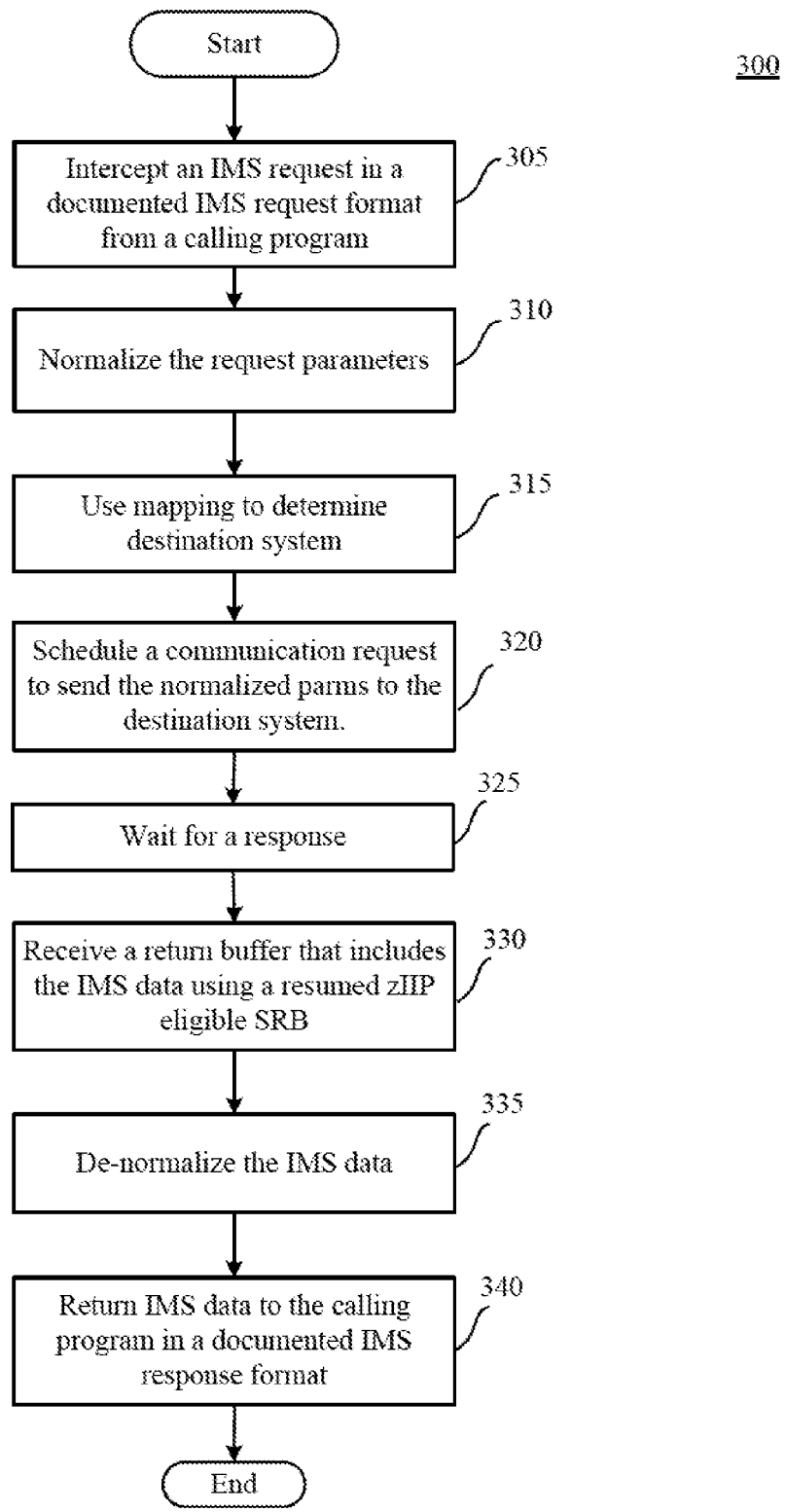
FIG. 3 is a flowchart illustrating a client-side process for accessing a remote IMS database, according to an implementation.

FIG. 3 is a flowchart of a client-side method 300 for accessing a remote IMS database, according to an implementation. In one implementation, process 300 may be invoked by a client program running on a zSeries® mainframe, such as mainframe computing system 100 shown in FIG. 1. In some implementations, process 300 may be performed by a client-side redirection subsystem, such as redirect request handler 126 and redirect server 128 of FIGS. 1 and 2. The client program may be a program from a mainframe subsystem such as CICS or a batch business application, or some other process that uses any documented IMS database request format, to access IMS database data. Examples of documented IMS database request formats include, but are not limited to, DRA, DL/I, and ODBA.

At 305, the redirect request handler 126 may intercept an IMS request made by the client program. For example, if the client program is a batch process, the redirect request handler 126 may intercept an IMS attach request. As another example, a database administrator may configure the client program environment, such as CICS, to redirect an IMS request otherwise sent to a documented IMS request interface, such as the DRA interface, to the redirect request handler. This configuration may be done, for example, as a CICS install or update. Other subsystems may be configured in a similar manner. The IMS request may include parameters that identify the IMS system to which the request is directed. In some implementations, the redirect request handler 126 may schedule a zIIP eligible SRB that invokes the redirect server. The redirect server may normalize the request parameters, creating a request buffer to send to a destination system (310). Normalization may allow the request buffer to be transmitted in a contiguous data structure to expedite transmission of the data. The redirect server may determine a destination system based on a mapping of IMS systems to computing systems (315). For example, a redirect server running on a particular mainframe may report the IMS systems that are running on the same particular mainframe to other redirect servers. Each redirect server that receives this information may create a mapping that allows the redirect server to determine which system has the IMS system identified in the request. The redirect server may then schedule a communication request, which causes the normalized buffer to be sent to the destination system (320). Once the request is scheduled, in some implementations, the SRB associated with the request may be paused so that it can be resumed when the response is received. The redirect server may then wait for the response (325).

When the destination system returns the response, the redirect server may receive the return buffer (330). The return buffer may include the data from the IMS system and, in some implementations, other data such as statistics relating to the response or a program communication block (PCB) that communicates the status of the request. In some implementations, the SRB used to send the request may be resumed to handle the processing of the response. At 335 the redirect server may de-normalize the IMS data in the return buffer, placing the data in a documented IMS response format expected by the client program that initiated the request. For example, IMS requests for CICS transactions may differ in format from IMS requests made from batch applications. Furthermore, each IMS batch program, for example BMP, DLI, DBB, JBP, IFP, etc., may have a format that differs from each other. Thus, the redirect server may format the normalized request it received into a format corresponding to the client program that issued the request. As explained above, the task that performs the data manipulation of de-normalization may use a zIIP eligible SRB. The redirect server may pass the de-normalized data to the redirect request handler, which provides the response to the client program that initiated the request (340). The response may be in a format used by the IMS request/response interface, so that the client program is not aware that the request was intercepted by the redirect request system. Thus, the redirect request handler and redirect server allow remote access to IMS data without changes to the underlying requesting programs.

Figure 4:
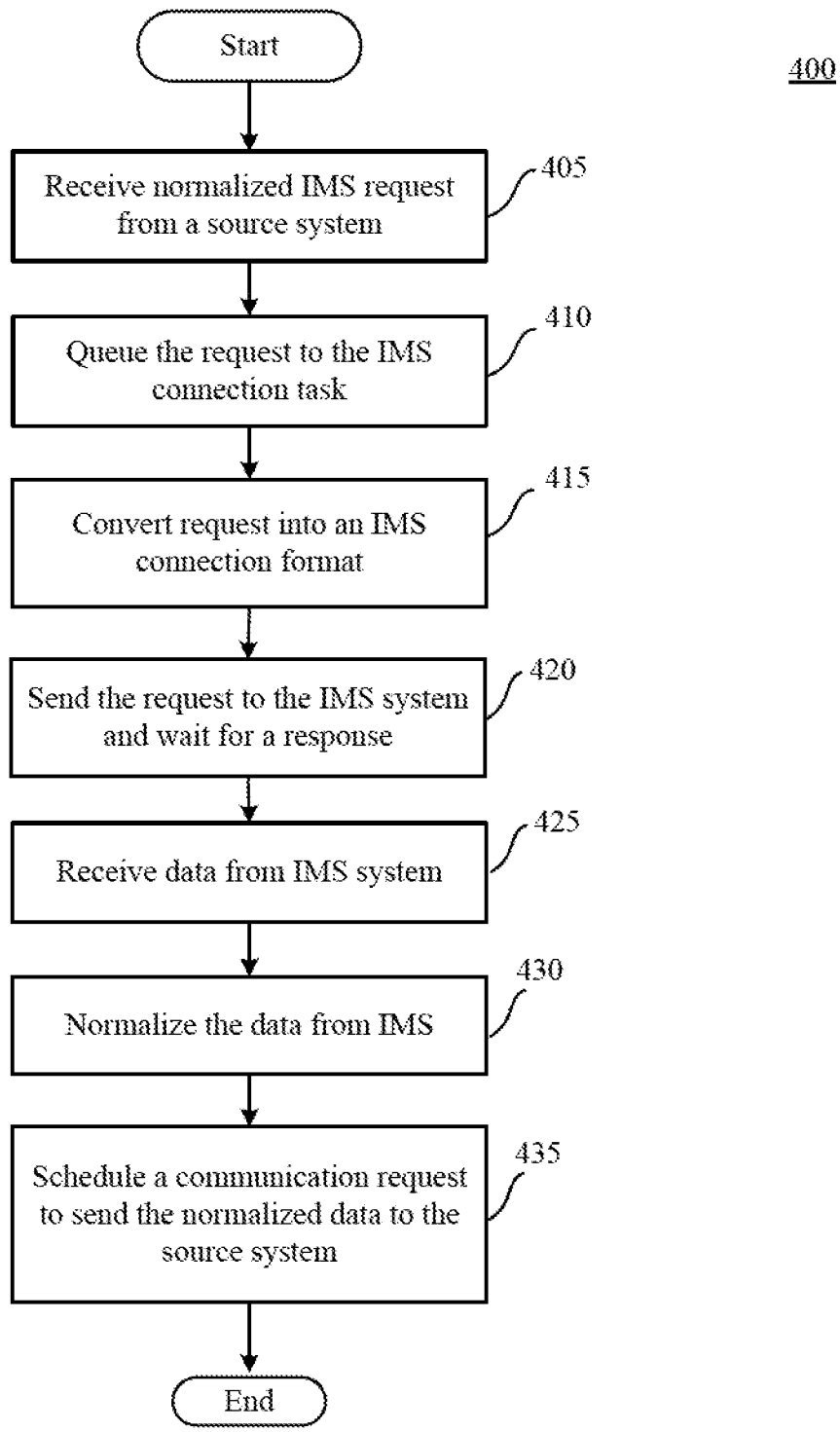
FIG. 4 is a flowchart illustrating a server-side process for responding to a client-side request for remote access to an IMS database, according to an implementation.

FIG. 4 is a flowchart illustrating a server-side process 400 for responding to a client-side request for remote access to an IMS database, according to an implementation. A redirect server running on a mainframe with an IMS system, such as redirect server 178 of FIGS. 1 and 2 may perform process 400 after receiving an IMS request from a client-side (or requesting) redirect server. At 405 the redirect server may receive a normalized IMS request from a source system. The source system may be a mainframe system running a client program, such as a batch process or a CICS transaction, that requests access to an IMS system. The source system is remote from the system running the IMS system. For example, the source system may be an LPAR different than the LPAR running the IMS system, or the source system may be a different mainframe than the mainframe running the IMS system. The redirect server may place the de-normalized request on the IMS connection task queue (410). For example, the redirect server may act as a Coordinator Controller (CCTL) to establish an IMS DRA connection with the IMS system requested. In some implementations, the redirect server may select a different IMS system than the specific IMS system requested. For example, the requested IMS system may be part of a data sharing group. In this circumstance, if the requested IMS system is unavailable, the redirect server may substitute another IMS system from the data sharing group to process the request. This allows for redundancy not currently available to applications connecting to IMS systems directly through DRA. Furthermore, the redirection system of client-side and server-side redirect servers allows different transactions within a single CICS application to connect to different IMS systems. Each transaction may specify a different IMS system in making the IMS request. This ability is also not available under current IMS access methods.

When the IMS request is placed on the IMS queue, in some implementations, the redirect server may de-normalize the request into a format used by the IMS connection interface, such as a DRA interface (415). For example, in some implementations the normalized data may be a DRA connection format and the redirect server may only need to change pointers in the normalized data to send the request to IMS. In other implementations, the redirect server may reformat the data of the normalized request into an IMS connection format, such as the DRA connection format, before sending the request to the selected IMS system. The DRA then functions as it currently does, sending the request to the IMS system and waiting for a response (420). When the IMS system has completed its processing, the IMS system sends the response back to the redirect server via the DRA. Thus, the redirect server receives the response from the IMS system (425). The response may include data from the IMS system as well as other information, such as statistics relevant to the request. The redirect server may then normalize the response (430). In some implementations, this may involve adjusting pointers and in some implementations this may also involve rearranging the data in the response. In some implementations, the normalization tasks may be performed using a zIIP eligible SRB. The redirection server may then schedule a communication request that sends the normalized data in the buffer to the source system (435). Process 400 then ends.

Implementations of the various techniques described herein may be implemented in digital electronic circuitry, or in computer hardware, firmware, software, or in combinations of them. Implementations may implemented as a computer program product, i.e., a computer program tangibly embodied in an machine-readable storage device (e.g., a tangible computer-readable medium that does not include a propagating signal), for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers, such as a storage device, suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks but do not include transitory propagating signals. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a mainframe or data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A source mainframe computing system comprising:
at least one general processor;
at least one lower-cost processor;
a client program executing on the source mainframe computing system, the client program configured to make an IMS database request using a documented IMS database request format; and
a redirect subsystem configured to perform operations comprising:
intercepting the IMS database request,
normalizing the IMS database request using a lower-cost processor eligible service request block,
selecting a destination mainframe computing system to respond to the request, the selection being based on a map that associates remote IMS database subsystems with corresponding destination mainframe computing systems,
scheduling a communication request directed to the destination mainframe computing system, the request including the normalized IMS database request,
receiving a normalized response from the destination mainframe computing system,
resuming the lower-cost processor eligible service request block to convert the normalized response into a documented IMS database response format, and
providing the converted response to the client program.

2. The mainframe computing system of claim 1, wherein the mainframe computing system is a first logical partition of a sysplex and the destination mainframe computing system is a second logical partition of the sysplex.

3. The mainframe computing system of claim 1, wherein the IMS database request specifies a first IMS database subsystem and the response from the destination mainframe computing system is from a second IMS database subsystem, the first IMS database subsystem differing from the second IMS database subsystem.

4. The mainframe computing system of claim 1, wherein the client program originates from a CICS transaction processing subsystem.

5. The mainframe computing system of claim 4, wherein the IMS database request is made by a first CICS transaction processing subsystem transaction specifying a first IMS database subsystem, and wherein the redirect subsystem performs the intercepting, normalizing, selecting, scheduling, receiving, converting, and providing for a second IMS database request made by a second CICS transaction processing subsystem transaction that specifies a second IMS database subsystem, the first IMS database subsystem differing from the second IMS database subsystem.

6. The mainframe computing system of claim 1, wherein the client program originates from a batch application.

7. The mainframe computing system of claim 6, wherein intercepting the IMS database request includes intercepting an attach request made by an operating system to instantiate the batch application.

8. The mainframe computing system of claim 1, wherein the normalized IMS database request uses a Database Resource Adaptor (DRA) connection format.

9. A computer-implemented method comprising:
intercepting, at a source mainframe system, an IMS database request from a client program executing on the source mainframe system, the request having a documented IMS database request format;
selecting a destination mainframe system to respond to the request, the selection being based on an IMS database subsystem identified in the request and on a map that associates remote IMS database subsystems with corresponding destination mainframe systems;
normalizing the IMS database request using a lower-cost processor eligible service request block,
sending a buffer including the normalized request from the source mainframe system to the destination mainframe system;
establishing, at the destination mainframe system, an IMS Database Resource Adapter (DRA) connection with the IMS database subsystem identified in the request;
receiving a response from the IMS database subsystem;
normalizing the response;
sending a buffer having the normalized response from the destination mainframe system to the source mainframe system;
resuming the lower-cost processor eligible service request block to convert the normalized response into a format appropriate for the documented IMS database request format; and
providing, at the source mainframe system, the converted response to the client program in a documented IMS database response format.

10. The method of claim 9, wherein the method further comprises:
determining, at the destination mainframe system, that the IMS database subsystem identified in the request cannot process the request; and
establishing, at the destination mainframe system, an IMS DRA connection with another IMS database subsystem that is in a data sharing group with the IMS database subsystem identified in the request.

11. The method of claim 9, wherein the source mainframe system is a first logical partition (LPAR) of a sysplex and the destination mainframe system is a second LPAR of the sysplex.

12. The method of claim 9, wherein the client program is a CICS transaction processing subsystem.

13. The method of claim 12, the method further comprising:
intercepting a second IMS database request from the CICS transaction processing subsystem, the request identifying a second IMS database subsystem that differs from the first IMS database subsystem;
selecting a second destination mainframe system to respond to the second IMS database request;
sending a buffer including information from the second request from the source mainframe to the second destination mainframe;
receiving a buffer having information from a second response from the second destination mainframe; and
providing the information from the second response to the CICS transaction processing subsystem.

14. The method of claim 12, wherein intercepting the IMS request includes modifying CICS transaction processing subsystem libraries to redirect the IMS database request from a DRA associated process to a redirect server on the source mainframe system.

15. The method of claim 9, wherein the source mainframe system lacks IMS database executable code.

16. A destination mainframe system comprising:
at least one general processor;
at least one lower-cost processor;
an IMS database subsystem including IMS database executable code; and
a redirect subsystem configured to perform operations comprising:
notifying a source mainframe system of the existence of the IMS database subsystem on the destination mainframe, the source mainframe lacking IMS database executable code,
receiving a first buffer from the source mainframe system, the first buffer including information from an IMS database request that identifies the IMS database subsystem in a normalized format,
converting the information to an IMS Database Resource Adapter (DRA) format,
queuing the information from the first buffer to an IMS database connection task for the IMS database subsystem,
receiving a response from the IMS database subsystem in the DRA format,
generating a second buffer having information from the response in the normalized format, and
sending the second buffer to the source mainframe system,
wherein the redirect subsystem is configured to perform at least generating the second buffer using a service request block eligible to run on the lower cost processor.

17. The mainframe system of claim 16 further comprising a data sharing group, wherein the IMS subsystem is one of a plurality of IMS database subsystems in the data sharing group, and wherein the redirect subsystem is further configured to:
determine that the IMS database subsystem is unavailable; and queue the second buffer to an IMS database connection task with another IMS database subsystem from the plurality of IMS database subsystems, wherein the response is received from the another IMS database subsystem.

18. The mainframe system of claim 16, wherein the source mainframe system is a first logical partition (LPAR) of a sysplex and the destination mainframe system is a second LPAR of the sysplex.

19. The mainframe system of claim 16, wherein the normalized format is a DRA connection format and converting the information includes adjusting pointers.

* * * * *